United States Patent
Koyama et al.

(10) Patent No.: US 11,193,022 B2
(45) Date of Patent: Dec. 7, 2021

(54) METHOD FOR PRODUCING LIGNIN-CONTAINING RESIN COMPOSITION AND LIGNIN-CONTAINING RESIN MOLDED ARTICLE

(71) Applicant: IDEMITSU KOSAN CO., LTD., Tokyo (JP)

(72) Inventors: Yoshihito Koyama, Chiba (JP); Shinobu Yamao, Ichihara (JP); Masaki Okano, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/330,842

(22) PCT Filed: Sep. 4, 2017

(86) PCT No.: PCT/JP2017/031813
§ 371 (c)(1),
(2) Date: Mar. 6, 2019

(87) PCT Pub. No.: WO2018/047772
PCT Pub. Date: Mar. 15, 2018

(65) Prior Publication Data
US 2019/0211207 A1  Jul. 11, 2019

(30) Foreign Application Priority Data
Sep. 9, 2016 (JP) .............................. JP2016-177152

(51) Int. Cl.
| C08L 97/00 | (2006.01) |
| C08L 61/06 | (2006.01) |
| C08H 7/00 | (2011.01) |
| C08J 5/00 | (2006.01) |
| C08L 101/00 | (2006.01) |

(52) U.S. Cl.
CPC .............. *C08L 97/005* (2013.01); *C08H 6/00* (2013.01); *C08J 5/00* (2013.01); *C08L 61/06* (2013.01); *C08L 97/00* (2013.01); *C08L 101/00* (2013.01)

(58) Field of Classification Search
CPC ............ C08L 97/00; C08L 61/06; C08H 7/00
USPC .......................................................... 524/74
See application file for complete search history.

(56) References Cited

U.S. PATENT DOCUMENTS

| 2010/0155122 A1 | 6/2010 | Okabe et al. | |
| 2016/0145398 A1* | 5/2016 | Kajitani | C07G 1/00 |
| | | | 530/507 |
| 2016/0215143 A1* | 7/2016 | Gotou | C08L 61/04 |

FOREIGN PATENT DOCUMENTS

| CN | 101348558 A | 1/2009 | |
| CN | 101759857 A | 6/2010 | |
| CN | 101891933 A | 11/2010 | |
| CN | 102408740 A | 4/2012 | |
| CN | 104530639 A | 4/2015 | |
| CN | 104910335 A | 9/2015 | |
| JP | S52-150414 A | 12/1977 | |
| JP | H06-506967 A | 8/1994 | |
| JP | 2007-112841 A | 5/2007 | |
| JP | 2010-042604 A | 2/2010 | |
| JP | 2010-235872 * | 10/2010 | |
| JP | 4670011 B2 * | 4/2011 | |
| JP | 2013-035885 A | 2/2013 | |
| JP | 2014-015579 A | 1/2014 | |
| JP | 2014-047257 A | 3/2014 | |
| JP | 2015-048359 A | 3/2015 | |
| JP | 2016-060813 A | 4/2016 | |
| WO | WO-2014142289 A1 * | 9/2014 | ............... C08H 8/00 |
| WO | WO-2015/046588 A1 | 4/2015 | |
| WO | WO-2015146588 A1 * | 10/2015 | ........... A61B 8/4461 |
| WO | WO-2016/043218 A1 | 3/2016 | |
| WO | WO-2016/080469 A1 | 5/2016 | |

OTHER PUBLICATIONS

International Searching Authority, "International Search Report," issued in connection with International Patent Application No. PCT/JP2017/031813, dated Oct. 10, 2017.
International Searching Authority, "Written Opinion," issued in connection with International Patent Application No. PCT/JP2017/031813, dated Oct. 10, 2017.
Extended European Search Report dated Mar. 19, 2020 for corresponding Application No. 17848712.0.
Office Action dated Dec. 23, 2020 for corresponding Chinese Patent Application No. 201780055296.9.
Office Action dated Nov. 16, 2020 for corresponding European Patent Application No. 17848712.0.
Office Action dated Apr. 6, 2021 for corresponding Japanese Patent Application No. 2018-538400.
Office Action dated Aug. 3, 2021 issued in a corresponding Chinese Patent Application No. 201780055296.9, (7 pages).

* cited by examiner

*Primary Examiner* — Deve V Hall
(74) *Attorney, Agent, or Firm* — Foley & Lardner LLP

(57) ABSTRACT

The method for producing a resin composition of the present invention includes a step of obtaining a lignin-containing solution that contains a solubilized lignin prepared through a treatment of separating lignin in a lignin-containing solution and a solvent, and a step of adding a resin to the lignin-containing solution to thereby obtain a lignin/resin-containing solution. Also, the method for producing a resin composition of the present invention includes a step of mixing the lignin/resin-containing solution with at least one solvent selected from water and a hydrocarbon having a dipole moment of 0.25 d or less. The lignin-containing resin molded article of the present invention uses the resin composition obtained according to the production method of the present invention.

7 Claims, No Drawings

METHOD FOR PRODUCING LIGNIN-CONTAINING RESIN COMPOSITION AND LIGNIN-CONTAINING RESIN MOLDED ARTICLE

RELATED APPLICATIONS

The present application claims priority under 37 U.S.C. § 371 to International Patent Application No. PCT/JP2017/031813, filed Sep. 4, 2017, which claims priority to and the benefit of Japanese Patent Application No. 2016-177152, filed on Sep. 9, 2016. The contents of these applications are hereby incorporated by reference in their entireties.

TECHNICAL FIELD

The present invention relates to a method of producing a lignin-containing resin composition for producing a lignin-containing resin, and to a lignin-containing resin molded article obtained by molding the lignin-containing resin composition.

BACKGROUND ART

With the increase in environmental awareness, biomass-derived raw materials have become desired. However, in many cases, biomass-derived raw materials use raw materials that compete with foods such as starch and sugar, for example, as especially remarkable in production of bioethanol, and accordingly, problems to cause food cost increase and food production decrease have been pointed out. Given the situation, at present, a technique for producing biofuels and biochemical products from a cellulosic biomass not competing with foods has come to attract rising attention.

Examples of the cellulosic biomass include: trunks and empty fruit bunches of palm; fibers and seeds of palm fruits; bagasse (fibrous matter that remains after extracting sugarcane (including high-biomass sugarcane) juice); cane tops (tops and leaves of sugar canes); rice straws; wheat straws; rice hulls; corn cob and stover, and corn residues (corn stover, corn cob, and corn hulls); Sorghum (including sweet sorghum) residues; Jatropha Curcas seeds and hulls; cashew hulls; wood chips; switchgrass; napier grass; Erianthus; energy crops; and energy canes. All those cellulosic biomasses contain lignin in addition to cellulose and hemicellulose capable of being converted into sugar.

In general, lignin is separated from cellulose and hemicellulose to remain as a solid residue in a process of pretreatment and saccharification. The lignin remaining as a residue is, at present, used as fuel and is effectively utilized. However, from the viewpoint of further effective utilization of lignin, use of lignin capable of further enhancing the additional value of lignin is desired. One such use of lignin includes utilization of lignin for a raw material for a resin composition (for example, see PTLs 1 and 2).

PTL 1 discloses a thermoplastic resin composition containing a lignin degradation product obtained by treating a lignin-containing material under a predetermined condition in a mixed solvent containing water and alcohol, and a thermoplastic resin. The thermoplastic resin composition has high flowability and flame retardancy and is excellent in environmental performance.

PTL 2 discloses a resin composition containing a purified lignin, which is obtained by adding, to a lignin obtained by treating a raw material of a herbaceous biomass under a predetermined condition in a first solvent of a mixed solvent of water and at least one alcohol selected from an aliphatic alcohol having 4 to 8 carbon atoms, followed by removing the alcohol from the alcohol phase that separates at a temperature at which the first solvent undergoes two-phase separation, a second solvent of a single organic solvent except the alcohol contained in the first solvent or a mixed solvent of the organic solvent and water, and removing the second solvent from the solution dissolving the lignin in the second solvent, and a lignin-reactive compound having a functional group capable of reacting with the purified lignin. The resin composition has good processability, strength and heat resistance.

CITATION LIST

Patent Literature

PTL 1: JP 2014-15579 A
PTL 2: JP 2016-60813 A

SUMMARY OF INVENTION

Technical Problem

As described above, the resin compositions described in PTL 1 and PTL 2 are excellent in processability and strength. However, it is desirable to obtain a resin composition having further better processability and strength. It is also desirable to produce such a resin composition more efficiently. Given the situation, an object of the present invention is to provide a method of producing a lignin-containing resin composition capable of efficiently producing a resin composition excellent in processability and strength, and to provide a lignin-containing resin molded article produced by using such a lignin-containing resin composition having excellent processability and strength.

Solution to Problem

In general, lignin that has been solubilized through a treatment for separating lignin in a lignin-containing material is, after extracted with a solvent, then solidified through removal of the solvent, used in various uses. However, the present inventors have found that, when a solubilized lignin is mixed with a resin while the solubilized lignin is in a state dissolving in the solvent in the stage before solidification, a lignin-containing resin composition can be efficiently produced and the resin composition thus produced in that manner have excellent characteristics such as strength, and have completed the present invention.

Specifically, the present invention includes the following [1] to [6].

[1] A method of producing a lignin-containing resin composition, including: a step (A) of obtaining a lignin-containing solution that contains a solubilized lignin prepared through a treatment for separating lignin in a lignin-containing material and a solvent capable of dissolving the solubilized lignin, a step (B) of adding a resin to the lignin-containing solution to thereby obtain a lignin/resin-containing solution, and a step (C1) of removing the solvent from the lignin/resin-containing solution.

[2] A method of producing a lignin-containing resin composition, including: a step (A) of obtaining a lignin-containing solution that contains a solubilized lignin prepared through a treatment for separating lignin in a lignin-containing material and a solvent capable of dissolving the solubilized lignin, a step (B) of adding a resin to the lignin-containing solution to thereby obtain a lignin/resin-containing solution, and a step (C2) of mixing the lignin/resin-containing solution with at least one solvent selected from water and a hydrocarbon having a dipole moment of 0.25 d or less.

[3] The method of producing a lignin-containing resin composition according to the above [1] or [2], wherein the lignin-containing material is at least one selected from the group consisting of a plant biomass, a saccharification residue obtained in a step of saccharifying a plant biomass, and a side product obtained in a step of saccharifying a plant biomass.

[4] The method of producing a lignin-containing resin composition according to any one of the above [1] to [3], wherein the treatment for separating lignin in a lignin-containing material is carried out according at least one method selected from the group consisting of an organosolv method, a pressurized hot water method, a steam explosion method, an ammonia treatment method, an ammonia explosion method, an acid treatment method, an alkali treatment method, an oxidative degradation method, a pyrolysis method and a microwave heating method.

[5] The method of producing a lignin-containing resin composition according to any one of the above [1] to [4], wherein the resin is at least one phenol resin selected from the group consisting of a novolak-type phenol resin and a resol-type phenol resin.

[6] A lignin-containing resin molded article, which is produced by using the lignin-containing resin composition obtained according to the method of producing a lignin-containing resin composition of any one of the above [1] to [5].

Advantageous Effects of Invention

According to the present invention, there can be provided a method of producing a lignin-containing resin composition capable of efficiently producing a resin composition excellent in processability and strength, and a lignin-containing resin molded article produced by using the lignin-containing resin composition having excellent processability and strength.

DESCRIPTION OF EMBODIMENTS

First Embodiment

The method for producing a lignin-containing resin composition of the first embodiment of the present invention is described below.

[Method for Producing Lignin-Containing Resin Composition]

The method for producing a lignin-containing resin composition of the first embodiment of the present invention includes a step (A) of obtaining a lignin-containing solution that contains a solubilized lignin prepared through a treatment for separating lignin in a lignin-containing material, and a solvent capable of dissolving the solubilized lignin, a step (B) of adding a resin to the lignin-containing solution to thereby obtain a lignin/resin-containing solution, and a step (C1) of removing the solvent from the lignin/resin-containing solution. Hereinafter the lignin that has been solubilized is referred to as a solubilized lignin. According to the method, it is unnecessary to again dissolve a solidified solubilized lignin in a solvent for mixing it with a resin, and therefore, the lignin-containing resin composition can be produced efficiently. In addition, the solubilized lignin can be mixed with a resin without being solidified, and therefore the solubilized lignin can be more uniformly mixed on a molecular level relative to the resin. Accordingly, the properties of the resin composition, such as the processability of the resin composition and the strength of the cured product of the resin composition can be bettered.

(Step (A))

In the step (A), a lignin-containing solution that contains a solubilized lignin and a solvent capable of dissolving the solubilized lignin is obtained through a treatment for separating lignin in a lignin-containing material.

<Lignin>

Lignin is a compound containing propyl phenol and a derivative thereof as a structural unit, in which the units three-dimensionally bond to each other.

<Lignin-Containing Material>

The lignin-containing material may be at least one selected from the group consisting of a plant biomass, a lignin-containing resin, a side product obtained in a process of saccharifying a plant biomass, and a side product obtained in a pulp production process. Further, the lignin-containing material includes, in addition to those mentioned above, a saccharification residue obtained in a process of saccharifying a cellulosic biomass, and a black liquor obtained in a pulp production process. In a process of saccharifying a cellulosic biomass, the residue that may remain after hydrolysis of cellulose and hemicellulose followed by removal of the resultant sugar is a solid that contains lignin as a main component. Accordingly, the residue can be used as a lignin-containing material. From the viewpoint of easy availability and compatibility with the production method in the present invention, a preferred lignin-containing material is at least one selected from the group consisting of a plant biomass, a saccharification residue obtained in a step of saccharifying a plant biomass, and a side product obtained in a step of saccharifying a plant biomass.

Examples of the plant biomass include a woody biomass and a herbaceous biomass. Examples of the woody biomass include coniferous trees and broad-leaf trees, such as cedar trees, Japanese cypress trees, false cypress trees, cherry trees, *eucalyptus* trees, beech trees, and bamboos. Examples of the herbaceous biomass include: trunks and empty fruit bunches of palm; fibers and seeds of palm fruits; bagasse (fibrous matter that remains after extracting sugarcane and high-biomass sugarcane juice); cane tops (tops and leaves of sugarcane); rice straws; wheat straws; rice hulls; corn cobs, stovers, and residues (corn stovers, corn cobs, and corn hulls); Sorghum (including sweet sorghum) residues; Jatropha Curcas seed coats and hulls; cashew hulls; switchgrass; napier grass; Erianthus; high-biomass-yield crops; energy crops; and energy canes. Among them, from the viewpoints of the ease of availability and compatibility with the production method to be applied in the present invention, the herbaceous biomass is preferred, the empty fruit bunches of palm, the wheat straws, the corn stovers and/or residues, the bagasse, the cane tops, and the energy cane, and residues after the extraction of useful components thereof are more preferred, and the bagasse, the cane tops, and the energy cane, and residues after the extraction of useful components thereof are still more preferred. Examples of the useful components include hemicellulose, a carbohydrate, a mineral, and moisture.

A ground plant biomass can be used as the plant biomass. In addition, the plant biomass may be in any form of a block, a chip or powder. Further, the plant biomass may be in any state of a dried state or a hydrous state.

<Treatment for Separating Lignin in Lignin-Containing Material>

Examples of the treatment for separating lignin in a lignin-containing material is carried out according at least one method selected from the group consisting of an organosolv method, a pressurized hot water method, a steam explosion method, an ammonia treatment method, an ammonia explosion method, an acid treatment method, an alkali treatment method, an oxidative degradation method, a pyrolysis method and a microwave heating method. From the viewpoint of easiness in obtaining a solvent excellent in solubility for resin and from the viewpoint of easiness in removing the solvent, the treatment for separating lignin is preferably carried out according to at least one method selected from the group consisting of an organosolv method, a steam explosion method, an acid treatment method and an alkali treatment method, and an organosolv method is more preferred.

The organosolv method is a method of treating a lignin-containing material at a high temperature and under a high pressure using an organic solvent or a mixed solvent of water and an organic solvent. According to the method, a lignin-containing solution that contains a solubilized lignin, and an organic solvent capable of dissolving the solubilized lignin can be obtained. In this case, the organic solvent used in the treatment may be used directly as it is to be in a lignin-containing solution. Alternatively, using a solvent capable of extracting the solubilized lignin from the lignin-containing material that has been treated according to the treatment method, which will be described hereinunder, a lignin-containing solution may be obtained.

[Organic Solvent]

The organic solvent may be any of saturated or unsaturated, linear alcohols or branched alcohols. In addition, ketones such as acetone and methyl ethyl ketone, and ethers such as ethylene glycol, polyethylene glycol and tetrahydrofuran may also be used. The organic solvent may be a single solvent, or may be a mixture of two or more of solvents.

Above all, at least one selected from methanol, ethanol, propanol, 1-butanol, 2-methyl-1-propanol, 2-butanol, 2-methyl-2-propanol, pentanol, hexanol, heptanol, octanol, acetone and tetrahydrofuran is preferred; at least one selected from 1-butanol, 2-methyl-1-propanol, 2-butanol, ethanol, pentanol, hexanol and acetone is more preferred; at least one selected from 1-butanol, 2-methyl-1-propanol, 2-butanol, ethanol and acetone is even more preferred; 1-butanol, 2-methyl-1-propanol and 2-butanol are further preferred; and 1-butanol is especially preferred.

[Mixed Solvent]

In the case where a mixed solvent of an organic solvent and water is used, the organic solvent may be the above-mentioned one, and preferred examples thereof are also the same as above. Examples of water usable herein include tap water, industrial water, ion-exchanged water and distilled water.

The pressurized hot water method is a method of treating a lignin-containing material in water at a high temperature and under a high pressure in a subcritical region at around a critical point (374° C., 22 MPa). Using a solvent to be mentioned below, a soluble lignin is extracted out from the lignin-containing material treated according to the treatment method to give a lignin-containing solution that contains a solubilized lignin and a solvent capable of dissolving the solubilized lignin.

The steam explosion method is a method of introducing steam into a lignin-containing material under pressure and instantaneously releasing the pressure to explode the lignin-containing material. Using a solvent to be mentioned below, a soluble lignin is extracted out from the exploded lignin-containing material to give a lignin-containing solution that contains a solubilized lignin and a solvent capable of dissolving the solubilized lignin.

The ammonia treatment method is a method of treating a lignin-containing material in the presence of heated and pressurized ammonia. The method produces a lignin-containing solution that contains a solubilized lignin and a solvent capable of dissolving the solubilized lignin. In this case, the aqueous ammonia solution used for the treatment may be directly used as it is to give a lignin-containing solution. Using a solvent for extracting a soluble lignin from the lignin-containing solution treated according to the treatment method, which will be mentioned below, a lignin-containing solution may also be produced.

The ammonia explosion method is a method of explosion a lignin-containing material by instantaneously releasing a pressure in the presence of heated and pressurized ammonia. Using a solvent to be mentioned below, a soluble lignin is extracted out from the exploded lignin-containing material to give a lignin-containing solution that contains a solubilized lignin and a solvent capable of dissolving the solubilized lignin.

The acid treatment method is a method of treating a lignin-containing material using an inorganic acid such as diluted sulfuric acid, phosphoric acid, diluted hydrochloric acid or diluted nitric acid, or an organic acid such as formic acid, acetic acid, oxalic acid or malic acid. The method produces a lignin-containing solution that contains a solubilized lignin and a solvent capable of dissolving the solubilized lignin. In this case, the aqueous acid solution used for the treatment may be directly used as it is to give a lignin-containing solution. Using a solvent for extracting a soluble lignin from the lignin-containing solution treated according to the treatment method, which will be mentioned below, a lignin-containing solution may also be produced.

The alkali treatment method is a method of treating a lignin-containing material using sodium hydroxide, potassium hydroxide, calcium hydroxide or magnesium hydroxide. The method produces a lignin-containing solution that contains a solubilized lignin and a solvent capable of dissolving the solubilized lignin. In this case, the aqueous alkali solution used for the treatment may be directly used as it is to give a lignin-containing solution. Using a solvent for extracting a soluble lignin from the lignin-containing solution treated according to the treatment method, which will be mentioned below, a lignin-containing solution may also be produced.

The oxidative degradation method is a method of oxidative degradation of a lignin-containing material with an oxidizing agent of an organic peroxide, hydrogen peroxide or oxygen. Using a solvent to be mentioned below, a soluble lignin may extracted out from the lignin-containing material treated according to this method to give a lignin-containing solution that contains a solubilized lignin and a solvent capable of dissolving the solubilized lignin.

The pyrolysis method is a method of heating a substance at a high speed or at a low speed to thereby degrade a lignin-containing material. With that, using a solvent to be mentioned below, a soluble lignin may extracted out from the degraded lignin-containing material to give a lignin-containing solution that contains a solubilized lignin and a solvent capable of dissolving the solubilized lignin.

The microwave heating method is a method of pyrolysis of a lignin-containing material using the heat of a substance through interaction of microwaves and the substance. With that, using a solvent to be mentioned below, a soluble lignin may extracted out from the pyrolyzed lignin-containing material to give a lignin-containing solution that contains a solubilized lignin and a solvent capable of dissolving the solubilized lignin.

The solvent for extracting a soluble lignin includes methanol, ethanol, propanol, butanol, tetrahydrofuran, acetone, methyl ethyl ketone, diethyl ether, ethylene glycol, polyethylene glycol, ethyl acetate, acetonitrile, N,N-dimethylformamide, dimethylsulfoxide, toluene and benzene. One alone of these or a mixture of two or more thereof may be used. A preferred solvent is at least one selected from the group consisting of methanol, ethanol, propanol, butanol and acetone. The solvent for extracting a soluble lignin may further contain water.

(Step (B))

In the step (B), a resin is added to the lignin-containing solution to give a lignin/resin-containing solution.

<Resin>

Not specifically limited, the resin to be used in the step (B) may be any resin capable of being dissolved in the solvent that dissolves the soluble lignin, and may be a thermosetting resin or a thermoplastic resin. However, in consideration of the molding method to give a molded article suitable for use for the lignin-containing resin composition, a thermosetting resin is preferred. Examples of the resin for use in the step (B) include a phenol resin such as a novolak-type phenol resin and a resol-type phenol resin. In addition, any other ordinary thermosetting resins such as an epoxy resin, a polyurethane resin, a melamine resin, an urea resin, an unsaturated polyester resin, a silicone resin and an alkyd resin, as well as any other ordinary thermoplastic resin such as polycarbonate resin, a styrene resin, a polystyrene elastomer, a polyethylene resin, a polypropylene resin, a polyacrylic resin (e.g., a polymethyl methacrylate resin), a polyvinyl chloride resin, a cellulose acetate resin, a polyamide resin, a low melting point polyester resin typified by a polyester of a combination of terephthalic acid and ethylene glycol, or terephthalic acid and 1,4-butanediol (e.g., PET or PBT), a polylactic acid and/or a copolymer containing a polylactic acid, an acrylonitrile-butadiene-styrene resin (ABS resin), a polyphenylene oxide resin (PPO), a polyketone resin, a polysulfone resin, a polyphenylene sulfide resin (PPS), a fluorine resin, a silicon resin, a polyimide resin, a polybenzimidazole resin, and a polyamide elastomer, and copolymers of those resins and other monomers are also usable.

Among the above-mentioned resins, a phenol resin is preferred as having a phenolic hydroxy group like lignin, capable of reacting lignin and usable as a diluent for lignin, and at least one phenol resin selected from the group consisting of a novolak-type phenol resin and a resol-type phenol resin is more preferred.

The blending amount of the resin is, in general, from the viewpoint of obtaining a resin composition having a high strength, preferably 10 to 2,000 parts by mass relative to 100 parts by mass of the lignin solid content in the lignin-containing solution, more preferably 20 to 1,000 parts by mass, even more preferably 50 to 500 parts by mass.

(Step (C1))

In the step (C1), the solvent is removed from the lignin/resin-containing solution. Examples of the method for removing the solvent include a method of depressurizing the atmosphere of the lignin/resin-containing solution with heating to be in a reduced-pressure state or in a vacuum state to thereby evaporate the solvent, a method of neutralizing the lignin/resin-containing solution or adding a poor solvent (e.g., water, hydrocarbon) to the lignin/resin-containing solution followed by separating the resultant solid through solid-liquid separation, and a method of combining the solvent evaporation method and the solid-liquid separation method.

(Other Compound Containable in Lignin-Containing Resin Composition)

<Lignin-Reactive Compound>

In addition to the above-mentioned resin, a lignin-reactive compound having a functional group capable of reacting with lignin may be contained in the lignin-containing resin composition. Examples of the compound having a functional group capable of reacting with lignin include (i) a compound that causes electrophilic substitution reaction with a phenol compound (excepting the resin used in the step (B)), (ii) an epoxy group-having compound (excepting the resin used in the step (B)), and (iii) an isocyanate group-having compound (excepting the resin used in the step (B)).

Lignin has a phenolic structural unit, and is usable as a base resin material for a phenol resin and an epoxy resin, an additive (curing agent) to an epoxy resin, and an additive to a thermoplastic resin.

In the step (B), a lignin-reactive compound may be added along with resin, or between the step (B) and the step (C1), a step of adding a lignin-reactive compound may be provided, or after the step (C1), a lignin-reactive compound may be added. As a method of adding a lignin-reactive compound to the lignin-containing resin obtained by removing the solvent from the lignin/resin-containing solution after the step (C1), for example, a method of kneading a mixture of the lignin-containing resin and a lignin-reactive compound using a kneader may be employed.

(i) Compound that Causes Electrophilic Substitution Reaction with Phenol Compound Examples of the compound that causes an electrophilic substitution reaction with a phenol compound include formaldehyde, a formaldehyde-donating curing agent compound, and a formaldehyde-equivalent compound. Hexamethylenetetramine, hexaformaldehyde, and a paraformaldehyde can be commercially used. As an example, when the compound is hexamethylenetetramine, the content of lignin and resin, and hexamethylenetetramine is preferably as described below.

That is, the total content of lignin and resin is preferably 30% by mass or more and 98% by mass or less in the lignin-containing resin composition, and the content of hexamethylenediamine is preferably 2% by mass or more and 50% by mass or less in the lignin-containing resin composition. When the content of hexamethylenetetramine falls within the range, a cured product having a satisfactory external appearance and satisfactory physical properties is obtained. From the foregoing viewpoint, the content of hexamethylenetetramine is more preferably 5% by mass or more and 30% by mass or less in the lignin-containing resin composition, more preferably 10% by mass or more and 20% by mass or less.

In the case where hexamethylenetetramine is used as the compound that causes electrophilic substitution reaction with a phenol compound, the resin is preferably a phenol resin. As described above, lignin has a phenolic structural unit, and hence the phenol resin can be used as a diluent or extender for lignin to the extent that the physical properties of the resin composition, such as processability, strength, and heat resistance, are not reduced.

In the case where a phenol resin is used as the resin, preferably, the lignin content is 5% by mass or more and 90% by mass or less in the lignin-containing resin composition, the content of the resin mixture containing the phenol resin in an amount of 10% by mass or more and 95% by mass or less is 30% by mass or more and 98% by mass or less in the lignin-containing resin composition, and the hexamethylenetetramine content is 2% by mass or more and 50% by mass or less in the lignin-containing resin composition.

(ii) Epoxy Group-Having Compound

An epoxy group-having compound belongs to a category that is referred to as a so-called epoxy resin. Examples thereof include: 2,2-bis(4'-hydroxyphenyl)propane (referred to as bisphenol A), bis(2-hydroxyphenyl)methane (referred to as bisphenol F), 4,4'-dihydroxydiphenyl sulfone (referred to as bisphenol S), 4,4'-dihydroxybiphenyl, resorcin, saligenin, trihydroxydiphenyldimethylmethane, tetraphenylolethane, halogen-substituted products and alkyl group-substituted products thereof, and a glycidyl ether-based epoxy resin synthesized from a compound having two or more hydroxy groups in a molecule thereof, such as butanediol, ethylene glycol, erythrit, novolac, glycerin, or a polyoxyalkylene, and epichlorohydrin or the like; a glycidyl ester-based epoxy resin synthesized from the compound having two or more hydroxy groups in a molecule thereof and phthalic acid glycidyl ester or the like; an epoxy resin having a glycidyl group, such as a glycidyl amine-based epoxy resin synthesized from a primary or secondary amine, such as aniline, diaminodiphenylmethane, m-xylenediamine, or 1,3-bisaminomethylcyclohexane, and epichlorohydrin or the like; and an epoxy resin free of a glycidyl group, such as an epoxidized soybean oil, an epoxidized polyolefin, vinylcyclohexene dioxide, or dicyclopentadiene dioxide. Among them, a cresol-novolak-type epoxy resin and a phenol-novolak-type epoxy resin having a chemical structure similar to that of lignin and hence having satisfactory compatibility therewith are preferred.

The equivalent ratio of the phenolic hydroxy groups in lignin to the epoxy groups in the epoxy group-having compound (phenolic hydroxy group/epoxy group) is preferably 0.7 or more to 1.3 or less.

When the ratio "phenolic hydroxy groups/epoxy groups" is close to 1, the amount of an unreacted component of any one of the functional groups reduces, and hence the thermosetting resin composition has a satisfactory external appearance and easily maintains its strength. From this viewpoint, the ratio "phenolic hydroxy groups/epoxy groups" in lignin is more preferably 0.8 or more to 1.2 or less, still more preferably 0.9 or more to 1.1 or less.

In the case where an epoxy group-having compound is sued as the lignin-reactive compound, the resin is preferably a phenol resin. In the case where a phenol resin is used as the resin, preferably, the lignin content is 5% by mass or more and 90% by mass or less in the lignin-containing resin composition, and the equivalent ratio of the total of the phenolic hydroxy groups in the resin composition containing the phenol resin in an amount of 10% by mass or more and 95% by mass or less to the epoxy groups in the epoxy resin (total of phenolic hydroxy groups/epoxy groups) is 0.7 or more and 1.3 or less.

In the case where an epoxy group-having compound is used as the lignin-reactive compound, a curing accelerator may be appropriately contained in the lignin-containing resin composition in accordance with the object of curing reaction acceleration. Specific examples thereof include: imidazoles, such as 2-methylimidazole, 2-ethylimidazole, and 2-ethyl-4-methylimidazole; tertiary amines, such as 2-(dimethylaminomethyl)phenol and 1,8-diazabicyclo(5,4,0)undecene-7; phosphines, such as triphenylphosphine; quaternary ammonium salts, such as a tetrabutylammonium salt, a triisopropylmethylammonium salt, a trimethyldecanylammonium salt, and a cetyltrimethylammonium salt; quaternary phosphonium salts, such as a trip henylbenzylphosphonium salt, a trip henylethylphosphonium salt, and a tetrabutylphosphonium salt; and metal compounds, such as tin octylate. As counter ions of the quaternary phosphonium salts, there are given, for example, a halogen, an organic acid ion, and a hydroxide ion, and the organic acid ion and the hydroxide ion are particularly preferred.

The content of the curing accelerator is preferably 0.1% by mass or more and 10% by mass or less in the lignin-containing resin composition. When the content of the curing accelerator falls within the range, excellent reactivity is obtained, and the resin composition to be obtained is excellent in heat resistance and strength. From this viewpoint, the content of the curing accelerator is more preferably 0.3% by mass or more and 5% by mass or less in the lignin-containing resin composition, even more preferably 0.5% by mass or more and 3% by mass or less.

In the step (B), a curing accelerator may be added along with resin, or a step of adding a curing accelerator may be provided between the step (B) and the step (C1), or a curing accelerator may be added after the step (C1). As a method of adding a curing accelerator to the lignin-containing resin obtained by removing the solvent from the lignin/resin-containing solution after the step (C1), for example, a method of kneading a mixture of the lignin-containing resin and a curing accelerator using a kneader may be employed.

(iii) Isocyanate Group-Having Compound

An isocyanate group-having compound is a polyisocyanate, or is obtained by causing the polyisocyanate and a polyol to react with each other. Examples of the polyisocyanate include: aromatic polyisocyanates, such as tolylene diisocyanate (TDI), 4,4'-diphenylmethane diisocyanate (MDI), polymeric MDI (MDI-CR), and carbodiimide-modified MDI (liquid MDI); aliphatic polyisocyanates, such as norbornane diisocyanate (NBDI), isophorone diisocyanate (IPDI), hexamethylene diisocyanate (HDI), 4,4'-methylene-bis(cyclohexyl isocyanate) (hydrogenated MDI), and xylylene diisocyanate (XDI); and block isocyanates. Among them, tolylene diisocyanate (TDI) and 4,4'-diphenylmethane diisocyanate (MDI) are preferably used.

The equivalent ratio of the total of the phenolic hydroxy groups and the alcoholic hydroxy groups in lignin to the isocyanate groups in the isocyanate compound (total of phenolic hydroxy groups and alcoholic hydroxy groups/isocyanate groups) is preferably 0.8 or more to 1.2 or less. When the ratio "total of phenolic hydroxy groups and alcoholic hydroxy groups/isocyanate groups" falls within the range, the unreacted amount of any one of the functional groups reduces, and hence failure phenomena concerning the curing rate, external appearance, and physical properties of the resin composition are suppressed.

From the foregoing viewpoint, the equivalent ratio of the total of the phenolic hydroxy groups and alcoholic hydroxy groups in lignin to the isocyanate groups in the isocyanate compound (total of phenolic hydroxy groups and alcoholic hydroxy groups/isocyanate groups) is more preferably 0.85 or more to 1.15 or less, still more preferably 0.9 or more to 1.1 or less.

In the case where an isocyanate group-having compound is used as the lignin-reactive compound, the resin is preferably a phenol resin. In this case, preferably, the lignin content is 5% by mass or more and 90% by mass or less in the lignin-containing resin composition, and the equivalent ratio of the total of the phenolic hydroxy groups and alcoholic hydroxy groups in the resin composition containing the phenol resin in an amount of 10% by mass or more and 95% by mass or less, to the isocyanate groups in the isocyanate compound (total of phenolic hydroxy groups and alcoholic hydroxy groups/isocyanate groups) is 0.8 or more and 1.2 or less.

In the case where an isocyanate group-having compound is used as the lignin-reactive compound, a curing accelerator may be appropriately contained depending on the object of curing reaction acceleration. Examples of the curing accelerator include an organic metal-based catalyst with zirconium or aluminum, and dibutyltin laurate, a phenol salt or octylic acid salt of DBU, an amine, and imidazole. Among them, an organic metal-based catalyst, such as aluminum sec-butyrate, aluminum ethylacetoacetate diisopropylate, zirconium tributoxy-acetylacetonate, or zirconium tetraacetylacetonate, is particularly preferred in terms of a coloring property. The content of the curing accelerator is preferably 0.001% by mass or more to 1.0% by mass or less, more preferably 0.05% by mass or more to 0.5% by mass or less in the lignin-containing resin composition.

In the step (B), a curing accelerator may be added along with resin, or between the step (B) and the step (C1), a step of adding a curing accelerator may be provided, or after the step (C1), a curing accelerator may be added. As a method of adding a curing accelerator to the lignin-containing resin obtained by removing the solvent from the lignin/resin-containing solution after the step (C1), for example, a method of kneading a mixture of the lignin-containing resin and a curing accelerator using a kneader may be employed.

<Inorganic Filler and Organic Filler>

The lignin-containing resin composition may further contain a filler. The filler may be an inorganic filler, or may be an organic filler.

Examples of the inorganic filler include silica powder, such as spherical or crushed fused silica or crystalline silica, alumina powder, glass powder, glass fiber, glass flake, mica, talc, calcium carbonate, alumina, hydrated alumina, boron nitride, aluminum nitride, silicon nitride, silicon carbide, titanium nitride, zinc oxide, tungsten carbide, and magnesium oxide.

Examples of the organic filler include carbon fiber, aramid fiber, paper powder, cellulose fiber, cellulose powder, chaff powder, fruit shell or nut powder, chitin powder, and starch. A single inorganic filler or organic filler may be incorporated, or a combination of a plurality of such fillers may be incorporated, and a filler content is determined in accordance with purposes. When the inorganic filler and/or the organic filler is incorporated, the content of the inorganic filler and/or the organic filler is desirably proper in order that satisfactory physical properties and satisfactory moldability may be obtained. From the above viewpoint, an upper limit value for the content of the inorganic filler and/or the organic filler is preferably more than 0% by mass and 400% by mass or less, more preferably 0% by mass or more to 300% by mass or less, still more preferably 0% by mass or more to 250% by mass or less in the lignin-containing resin composition.

In the step (B), a filler may be added along with resin, or between the step (B) and the step (C1), a step of adding a filler may be provided, or after the step (C1), a filler may be added. As a method of adding a filler to the lignin-containing resin obtained by removing the solvent from the lignin/resin-containing solution after the step (C1), for example, a method of kneading a mixture of the lignin-containing resin and a filler using a kneader may be employed.

<Other Additives>

Various additives may be added to the lignin-containing resin composition of the present invention to the extent that the characteristics of the molded article produced by using the lignin-containing resin composition are not impaired. In addition, a compatibilizer, a surfactant or the like can be further added thereto in accordance with purposes.

Examples of the surfactant include, but not particularly limited to, linear fatty acids, such as stearic acid, palmitic acid, and oleic acid, and branched/cyclic fatty acids obtained by causing the acids to react with rosins.

Further, as additives that can be blended into the lignin-containing resin composition in addition to those described above, there are given, for example, a flexibilizer, a heat stabilizer, a UV absorber, a flame retardant, an antistatic agent, a defoaming agent, a thixotropy-imparting agent, a release agent, an antioxidant, a plasticizer, a stress-reducing agent, a coupling agent, a dye, a light-scattering agent, and a small amount of a thermoplastic resin. One kind alone of these may be used, or a mixture of two or more kinds thereof may be used.

In the step (B), the above-mentioned additives may be added along with resin, or between the step (B) and the step (C1), a step of adding the above-mentioned additives may be provided, or after the step (C1), the above-mentioned additives may be added.

[Lignin-Containing Resin Molded Article]

The lignin-containing resin molded article of the first embodiment of the present invention is produced by using the lignin-containing resin composition of the first embodiment of the present invention. As described above, the lignin-containing resin composition obtained according to the method for producing a lignin-containing resin composition of the first embodiment of the present invention is excellent in strength, and accordingly, the lignin-containing resin molded article of the first embodiment of the present invention has an excellent strength.

Examples of the lignin-containing resin molded article of the first embodiment of the present invention include, as thermosetting resin molded articles, heat insulating materials for housings, electronic parts, resins for frac sands, resins for coated sands, resins for immersion, resins for lamination, resins for FRP molding, automobile parts, and reinforcing materials for automobile tires. As thermoplastic resin molded articles, examples thereof include resin composition molded articles obtained according to conventionally known methods described in JP 2014-15579 A and WO2016/104634, and those molded articles are usable in the field of electrical and electronic products, information communication devices, OA devices, machines, automobiles, industrial materials and building materials.

<Method for Producing Molded Article>

A method for producing lignin-containing resin molded articles for producing the lignin-containing resin molded article of the first embodiment of the present invention includes, for example, a step of molding the lignin-containing resin composition obtained according to the production method for the lignin-containing resin composition of the first embodiment of the present invention into a predetermined shape. As described above, the lignin-containing resin composition of the first embodiment of the present invention has excellent processability, and therefore a lignin-containing resin molded article can be produced readily by using the lignin-containing resin composition of the first embodiment of the present invention.

<Molding>

The method of molding into a predetermined shape is not specifically limited so far as the method can mold a resin composition. For example, in the case where the resin composition is a thermosetting resin composition, the method of molding it into a predetermined shape includes a compression molding method, an injection molding method, a transfer molding method, a hollow molding method, and an FRP molding method. In the case where the resin composition is a thermoplastic resin composition, the method of molding it into a predetermined shape includes an extrusion molding method and an injection molding method.

Second Embodiment

The method for producing a lignin-containing resin composition of the second embodiment of the present invention is described below.

[Method for Producing Lignin-Containing Resin Composition]

The method for producing a lignin-containing resin composition of the second embodiment of the present invention includes a step (A) of obtaining a lignin-containing solution that contains a solubilized lignin and a solvent capable of dissolving the solubilized lignin through a treatment for separating lignin in a lignin-containing material, a step (B) of adding a resin to the lignin-containing solution to thereby obtain a lignin/resin-containing solution, and a step (C2) of mixing the lignin/resin-containing solution with at least one solvent selected from water and a hydrocarbon having a dipole moment of 0.25 d or less. Hereinafter a lignin that has been solubilized is referred to as a solubilized lignin. Like in the first embodiment, the method does not require redissolution of a solidified solubilized lignin in a solvent for mixing it with a resin, and therefore, the method can efficiently produce the lignin-containing resin composition. In addition, the solubilized lignin can be mixed with a resin without being solidified, and therefore the solubilized lignin can be more uniformly mixed on a molecular level relative to the resin. Accordingly, the properties of the resin composition, such as the processability of the resin composition and the strength of the cured product of the resin composition can be bettered.

(Step (A) and Step (B))

The step (A) and the step (B) in the method of producing a lignin-containing resin composition of the second embodiment of the present invention are the same as the step (A) and the step (B) in the method of producing a lignin-containing resin composition of the first embodiment of the present invention, and therefore description of the step (A) and the step (B) in the method of producing a lignin-containing resin composition of the second embodiment of the present invention is omitted.

The lignin-reactive compound, the curing accelerator, the inorganic filler, the organic filler and other additives usable in the method of producing a lignin-containing resin composition of the second embodiment of the present invention are the same as those usable in the method of producing a lignin-containing resin composition of the first embodiment of the present invention, and therefore description of the lignin-reactive compound, the curing accelerator, the inorganic filler, the organic filler and other additives usable in the method of producing a lignin-containing resin composition of the second embodiment of the present invention is omitted.

The lignin-reactive compound and others may be added in the step (B) along with resin, or between the step (B) and the step (C2) to be mentioned below, a method of adding the lignin-reactive compound and others may be provided, or the lignin-reactive compound and others may be added after the step (C3) or the step (C4) to be mentioned below.

(Step (C2))

In the step (C2), at least one solvent selected from water and a hydrocarbon having a dipole moment of 0.25 d or less is mixed with the lignin/resin-containing solution. The step (C2) corresponds to a step of purifying lignin in the lignin/resin-containing solution. Through the treatment step, lignin in the lignin/resin-containing solution becomes a purified lignin. The mixing method is not specifically limited so far as the lignin/resin-containing solution can be uniformly mixed with the solvent in the method. Examples of the apparatus for use for the mixing include an edge runner, a stirring mixing machine, a roll mill, a corn mill, a flat stone mill, a speed line mill, a ball mill, a bead mill, a sand grind mill, a pearl mill, an attritor, a vertical mixer, a kneader, and a high-speed stirring machine (dissolver).

<Water>

Examples of water usable here include tap water, industrial water, ion-exchanged water, and distilled water.

<Hydrocarbon Having Dipole Moment of 0.25 d or Less>

The hydrocarbon having a dipole moment of 0.25 d or less is preferably a saturated linear hydrocarbon, an unsaturated linear hydrocarbon, a saturated cyclic hydrocarbon or an unsaturated cyclic hydrocarbon having 5 to 8 carbon atoms. When the dipole moment of the hydrocarbon is more than 0.25 d, purification efficiency unfavorably lowers to worsen the heat resistance of lignin. Here, "dipole moment" is a value calculated with Winmostar MOPAC AM1 (MOP6W70). Examples of compounds that can be used as such hydrocarbons are shown below along with the dipole moment thereof.

TABLE 1

| Name | CAS No. | Chemical formula | Dipole moment (debye) |
|---|---|---|---|
| Pentane | 109-66-0 | $C_5H_{12}$ | 0.01 |
| Isopentane | 78-78-4 | $C_5H_{12}$ | 0.01 |
| Cyclopentane | 287-92-3 | $C_5H_{10}$ | 0.00 |
| Cyclohexene | 110-82-7 | $C_6H_{10}$ | 0.18 |
| Cyclohexane | 110-82-7 | $C_6H_{12}$ | 0.00 |
| Hexane | 110-54-3 | $C_6H_{14}$ | 0.00 |
| Methylcyclohexane | 108-87-2 | $C_7H_{14}$ | 0.01 |
| Heptane | 142-82-5 | $C_7H_{16}$ | 0.01 |
| 2,2,4-Trimethylpentane | 540-84-1 | $C_8H_{18}$ | 0.03 |
| Ethylbenzene | 110-41-4 | $C_8H_{10}$ | 0.25 |
| o-Xylene | 95-47-6 | $C_8H_{10}$ | 0.47 |
| m-Xylene | 108-38-3 | $C_8H_{10}$ | 0.31 |
| p-Xylene | 106-42-3 | $C_8H_{10}$ | 0.06 |
| Styrene | 100-42-5 | $C_8H_8$ | 0.02 |

The dipole moment of the hydrocarbon is preferably 0.23 d or less, more preferably 0.20 d or less. The lower limit of the dipole moment of the hydrocarbon is, though not specifically limited thereto, for example, 0.00 d.

<Amount of at Least One Solvent Selected from Water and Hydrocarbon Having Dipole Moment of 0.25 d or Less>

The amount of at least one solvent selected from water and a hydrocarbon having a dipole moment of 0.25 d or less is not specifically limited. The amount of the solvent to be mixed in the lignin/resin-containing solution is, in terms of by volume relative to the lignin/resin-containing solution, preferably 1 time or more and 50 times or less, more preferably 1 time or more and 40 times or less, even more preferably 1 time or more and 30 times or less, especially preferably 2 times or more and 20 times or less, and most preferably 2 times or more and 15 times or less. When the amount of at least one solvent selected from water and a hydrocarbon having a dipole moment of 0.25 d or less to be mixed with the lignin/resin-containing solution is, in terms of by volume, less than 1 time, the lightweight component contained in the lignin/resin-containing solution could not be sufficiently removed. On the other hand, when the amount of at least one solvent selected from water and a hydrocarbon having a dipole moment of 0.25 d or less to be mixed with the lignin/resin-containing solution is, in terms of by volume, more than 50 times, the intended purified lignin could not be efficiently collected. In the case where plural kinds of hydrocarbon solvents are used, the amount of the solvent mentioned above means the total amount of water and the plural kinds of hydrocarbon solvents.

Via the step (C2), lignin in the lignin/resin-containing solution is purified and therefore lignin in the lignin/resin-containing solution becomes a purified lignin.

Specifically, in the step (C2), a lightweight component and a heavyweight component can be separated from lignin contained in the lignin/resin-containing solution. Examples of the lightweight component include phenols such as vanillin, and perglycolytic products such as furfural, but are not specifically limited thereto. Examples of the heavyweight component include lignin having a weight-average molecular weight of 10,000 or more, but are not specifically limited thereto.

The solution temperature in the step (C2) of mixing the lignin/resin-containing solution and at least one solvent selected from water and a hydrocarbon having a dipole moment of 0.25 d or less is, in consideration of the stability of the solution and the solubility of lignin in the solution, preferably 0° C. or higher and 100° C. or lower. The solution temperature is more preferably 10° C. or higher and 90° C. or lower, even more preferably 20° C. or higher and 80° C. or lower, and especially preferably 25° C. or higher and 70° C. or lower.

In mixing the lignin/resin-containing solution and at least one solvent selected from water and a hydrocarbon having a dipole moment of 0.25 d or less in the step (C2), the system may be stirred, as needed. In the case where the system is stirred, it may be subjected to static separation, as further needed. The still standing time is generally 1 minute or more and 120 minutes or less. When the still standing time is 1 minute or more, the purified lignin can be sufficiently separated from the other components. Regarding the upper limit of the still standing time, 120 minutes will be sufficient. The still standing time is preferably 5 minutes or more and 100 minutes or less, more preferably 10 minutes or more and 60 minutes or less, even more preferably 15 minutes or more and 30 minutes or less.

(Step (C3) or Step (C4))

In the second embodiment of the present invention, preferably, the following step (C3) or (C4) is carried out depending on whether the mixed solution obtained in the step (C2) has two phases or one phase.

In the case where the mixed solution obtained in the step (C2) has two phases, preferably, a step (C3) is carried out after the step (C2). In the step (C3), the phase containing the lignin-containing resin composition obtained in the step (C2) is separated from the two phases, then the separated phase is concentrated, and the resultant solid is dried. For example, in the case where the mixed solution obtained in the step (C2) is separated in two phases of an aqueous phase and an organic phase, or in two phases of an aqueous phase, and an organic phase and a hydrocarbon phase having a dipole moment of 0.25 d or less, the targeted lignin-containing resin composition is dissolved in the organic phase side, and accordingly, in the step (C3), the organic phase side is separated, then the organic phase side is concentrated, and the resultant solid is dried. Here, "organic phase side" means a single phase that contains the organic phase and is to be separated from the aqueous phase in the case where the hydrocarbon phase having a dipole moment of 0.25 d or less and the organic phase containing heat-resistant lignin form a single phase. Naturally, in the case where the mixture is separated into two phases of an aqueous phase and an organic phase, the "organic phase side" means the organic phase. In the case where the solution obtained in the step (C2) is separated into two phases of a hydrocarbon phase having a dipole moment of 0.25 d or less and an organic phase (organic phase except the hydrocarbon), the targeted lignin-containing resin composition is dissolved in the organic phase side, and therefore, in the step (C3), the organic phase is separated, then the organic phase is concentrated and the resultant solid is dried. In the case where a solid forms in a state of two phases, the organic phase (side) is separated after solid-liquid separation.

In the case where the mixed solution obtained in the step (C2) is a single phase, the lignin-containing resin composition precipitates as a solid therein. In this case, the solid precipitates depending on the solubility difference, and therefore the lightweight component remains in the solution. Consequently, in the case where the mixed solution obtained in the step (C2) is a single phase, the method for producing a lignin-containing resin composition of the second embodiment of the present invention preferably includes a step (C4). In the step (C4), the system is subjected to solid-liquid separation, and the resultant solid is dried. The processed solution is concentrated, and then the resultant solid is dried. As described above, the lightweight component remains in the solution, and therefore drying the resultant solid gives a lignin-containing resin composition where the amount of the lightweight component has been reduced. In addition, drying the resultant solid also gives a lignin-containing resin composition where the amount of the heavyweight component has been reduced.

Not specifically limited, the method of concentrating the organic phase may be a method of evaporating away the solvent from the organic phase to such an extent that the concentration of the lignin-containing resin composition having dissolved in the organic phase can be increased so that the lignin-containing resin composition can be precipitated out from the organic phase. The method of drying the solid is not also specifically limited so far as the method can remove the solvent from the solid through evaporation. The method of evaporating the solvent includes a method of heating the substance from which the solvent is evaporated away, or putting the substance in a reduced-pressure or vacuum atmosphere.

[Lignin-Containing Resin Molded Article]

The lignin-containing resin molded article of the second embodiment of the present invention is produced by using the lignin-containing resin composition of the second embodiment of the present invention. The lignin-containing resin molded article of the second embodiment of the present invention has an excellent strength like the lignin-containing resin molded article of the first embodiment of the present invention. Further, for example, the lignin/resin-containing solution is mixed with at least one solvent selected from water and a hydrocarbon having a dipole moment of 0.25 d or less so that the lignin in the lignin-containing resin composition is purified, and accordingly, a lignin-containing resin molded article containing a more purified lignin can be produced. The description of the lignin-containing resin molded article of the second embodiment of the present invention is common to that of the description of the lignin-containing resin molded article of the first embodiment of the present invention, and therefore, the description of the lignin-containing resin molded article of the second embodiment of the present invention is omitted.

[Method for Producing Glucose]

In the case where lignin in the lignin-containing material is solubilized in the step (A), a cellulose-containing solid substance may be obtained as a side product as the case may be, in addition to the lignin-containing compound containing a solubilized lignin and a solvent capable of dissolving the solubilized lignin. Using the cellulose-containing solid substance, glucose can be produced. A method of producing glucose of one embodiment is described below.

The method of producing glucose of one embodiment includes a step of enzymatic saccharification of the cellulose-containing solid substance obtained as a side product in the step of obtaining a lignin-containing solution in the method for producing a lignin-containing thermosetting resin composition of an embodiment of the present invention. Accordingly, the cellulose-containing solid substance produced as a side product in the method of producing a lignin-containing resin composition of an embodiment of the present invention can be effectively used.

<Enzymatic Saccharification>

Enzymatic saccharification is a treatment of hydrolyzing cellulose or a cellulose degradation product obtained by degradation of cellulose with an enzyme to convert it into glucose. The enzymatic saccharification condition is, for example, as follows.

The amount of the enzyme to act on cellulose contained in a cellulose-containing solid substance or on a cellulose degradation product obtained through degradation of cellulose may be 0.1 parts by mass or more and 200 parts by mass or less relative to 100 parts by mass of the cellulose-containing solid substance. The enzymatic activity in the enzymatic saccharification may be 100 U/g or more and 10,000 U/g or less. Further, the treatment temperature in the enzymatic saccharification may be 30° C. or higher and 70° C. or lower, at which the enzyme can be activated to increase the saccharification ratio. The treatment time for the enzymatic saccharification may be 12 hours or more and 168 hours or less, for which the enzyme can be activated to increase the saccharification ratio.

Cellulose contained in the cellulose-containing solid substance to be obtained in the step (A) as a side product has a small lignin content, and is therefore favorably used for saccharification with acid or enzyme.

In addition, the cellulose-containing solid substance obtained in the step (A) as a side product is in a state that may be more readily defibrated as compared with that of the cellulose-containing solid substance obtained by any other method. Accordingly, it has the advantage of easiness in use development.

[Other Uses of Cellulose-Containing Solid Substance]

From the cellulose-containing solid substance obtained as a side product in the step (A), ethanol, butanol, acetone and the like can be obtained in known methods.

In addition, from the cellulose-containing solid substance obtained as a side product in the step (A), chemical products can be obtained, including resin reinforcing fibers such as cellulose nanofibers and rubber and tire reinforcing materials as substitutions for chemical fibers, carboxymethyl cellulose, food additives such as oligosaccharides, as well as lactic acid, and succinic acid.

The methods for producing a lignin-containing resin composition of the first and second embodiments of the present invention are mere exemplifications of embodiments of the method for producing a lignin-containing resin composition of the present invention, and consequently, the methods for producing a lignin-containing resin composition of the first and second embodiments of the present invention do not restrict the method for producing a lignin-containing resin composition of the present invention.

The method for producing lignin-containing resin molded article of the first and second embodiments of the present invention are mere exemplifications of embodiments of the method for producing a lignin-containing resin molded article of the present invention, and consequently, the methods for producing a lignin-containing resin molded article of the first and second embodiments of the present invention do not restrict the method for producing a lignin-containing resin molded article of the present invention.

EXAMPLES

The present invention is described in more detail below with reference to Examples. However, the present invention is not limited to the following Examples.

Production Example of Lignin-Containing Resin

Production Example 1

Water was added to bagasse serving as a raw material to give a raw material slurry having a solid concentration of about 10% by mass.

The raw material slurry was fed into a reactor (pressure vessel) and heated up to a supercritical state or a subcritical state. The heating temperature was 170° C.

The resultant solid and a mixed solvent of water and 1-butanol prepared to have a 1-butanol concentration of 34% by mass were put into a SUS (stainless)-made batch device having an inner volume of 0.92 L. The total amount of the solvent was 315 g. With respect to the concentration of the raw material charged, raw material/solvent was 1/10.

The SUS-made batch device was purged with nitrogen, and treatment was carried out for 2 hours with heating up to 200° C. The treatment time was a lapse time after arriving at 200° C. The treatment temperature was measured with a thermocouple.

After the treatment, the SUS-made batch device was cooled, and after the temperature lowered to around room temperature, all the contents were taken out. After the treatment, the solid fraction and the liquid phase were separated through filtration.

200 g of water was added to the solid fraction, stirred for 30 minutes, and the solid fraction and the liquid phase were separated through filtration. This operation was repeated three times to give a cellulose-containing solid substance.

Using a separating funnel, the liquid phase was separated into an aqueous phase and a 1-butanol phase in a mode of liquid-liquid separation to give a lignin-containing solution containing a solubilized lignin and 1-butanol capable of dissolving the solubilized lignin (lignin solid content: 3.5 g). 1.9 g of novolak-type phenol resin (PR-53195 (manufactured by Sumitomo Bakelite Co., Ltd.) was added to the lignin-containing solution, the solvent was removed using an evaporator (70° C., water bath), and the residue was dried in vacuum at 125° C. to give a lignin-containing resin.

Production Example 2

A lignin-containing resin was produced according to the same operation as in Production Example 1 except that the mixed solvent of water and 1-butanol was prepared to have a 1-butanol concentration of 50% by mass.

Production Example 3

The same operation as in Production Example 1 was carried out except that a mixed solvent of water and ethanol prepared to have an ethanol concentration of 50% by mass was used in place of the mixed solution of water and 1-butanol prepared to have a 1-butanol concentration of 34% by mass. The lignin-containing solution after solid-liquid separation was a single phase, and therefore, after addition of the phenol resin, the organic solvent was removed using an evaporator so that the solid fraction precipitated in water owing to reduction in the solubility thereof was separated through filtration in a mode of solid-liquid separation, and the resultant solid was dried in vacuum at 125° C. to give a lignin-containing resin.

Production Example 4

A lignin-containing resin was produced according to the same operation as in Production Example 3 except that acetone was used in place of ethanol as the organic solvent in the mixed solvent.

Production Example 5

A lignin-containing resin was produced according to the same operation as in Production Example 1 except that 2-methyl-1-propanol was used in place of 1-butanol as the organic solvent in the mixed solvent.

Production Example 6

A lignin-containing resin was produced according to the same operation as in Production Example 1 except that bagasse, which was the raw material, was, without being heat-treated up to a supercritical state or a subcritical state, treated directly as it was, using a mixed solvent of water and 1-butanol.

Production Example 7

30 g of bagasse, which was the raw material, and 160 g of pure water were put into a SUS-made batch device having an inner volume of 0.92 L, and with stirring at 200 rpm, the contents were heated up to 200° C. and treated for 2 hours. The treatment time was a lapse time after arriving at 200° C. The treatment temperature was measured with a thermocouple. Next, the solid fraction and the liquid phase were separated through filtration. The solid fraction was immersed in 200 mL of acetone overnight, and the solid fraction was separated from the liquid phase through filtration to collect an acetone-soluble fraction (lignin content 4.2 g). Next, 2.3 g of a novolak-type phenol resin (PR-53195 (manufactured by Sumitomo Bakelite Co., Ltd.)) was added to the acetone-soluble fraction, the solvent was removed using an evaporator (70° C., water bath), and then the residue was dried in vacuum at 125° C. to give a lignin-containing resin.

Production Example 8

Bagasse, which was the raw material, was cut into pieces having a suitable size, put into a 3-liter pressure vessel of a steam explosion apparatus, steam was introduced thereinto under a pressure of 3.5 MPa, and kept as such for 3 minutes. Subsequently, the valve was rapidly opened to give a explosion-treated product. The explosion-treated product was washed with water until the pH of the washing could reach 6 or more to thereby remove the water-soluble component. 1,000 mL of acetone was added to 100 g of the resultant solid fraction, stirred for 3 hours, and the solid fraction and the liquid phase were separated through filtration to collect an acetone-soluble fraction (lignin content 4.0 g). Next, 2.2 g of a novolak-type phenol resin (PR-53195 (manufactured by Sumitomo Bakelite Co., Ltd.)) was added to the acetone-soluble fraction, the solvent was removed using an evaporator (70° C., water bath), and then the residue was dried in vacuum at 125° C. to give a lignin-containing resin.

Production Example 9

60 g of p-cresol was adsorbed to 120 g of bagasse, which was the raw material, 300 mL of 72% sulfuric acid was added thereto, and these were introduced into a SUS-made batch device having an inner volume of 0.92 L, and treated at 30° C. for 1 hour. After the acid was removed, the precipitate was dried, extracted with 600 mL of acetone (lignin content 5.0 g), 2.7 g of a novolak-type phenol resin (PR-53195 (manufactured by Sumitomo Bakelite Co., Ltd.)) was added, and then purified with diethyl ether. Next, this was dried in vacuum at 125° C. to give a lignin-containing resin.

Production Example 10

30 g of bagasse, which was the raw material, was mixed with 300 g of 95 mass % acetic acid and 0.9 g of sulfuric acid, and treated under reflux for 4 hours. After the treatment, the solid fraction and the liquid phase were separated through filtration to collect the liquid phase (lignin content 4.2 g). Next, 2.3 g of a novolak-type phenol resin (PR-53195

(manufactured by Sumitomo Bakelite Co., Ltd.)) was added, acetic acid in the liquid phase was removed using an evaporator, the residual liquid phase was concentrated down to 1/10 of the original volume, then water in an amount of 10 times (by mass) the concentrated liquid was added and filtered to give a lignin-containing resin.

Production Example 11

A lignin-containing resin was produced according to the same operation as in Production Example 1 except that a resol-type phenol resin (TD-2040C (manufactured by DIC Corporation)) was used in place of the novolak-type phenol resin.

Production Example 12

A lignin-containing resin was produced according to the same operation as in Production Example 1 except that the added amount of the novolak-type phenol resin was changed to 11.4 g.

Comparative Production Example 1

Not adding a novolak-type phenol resin to the lignin-containing solution, lignin was obtained by removing 1-butanol using an evaporator (70° C., water bath).

[Method of Evaluation of Resultant Lignin-Containing Resin]

<Softening Point>

The lignin-containing resin obtained in Production Examples 1 to 10 and 12, and lignin obtained in Comparative Production Example 1 were analyzed to measure the softening point thereof using a ring-and-ball method testing machine according to JIS K2207. The results are shown in Table 2.

<Moldability>

85 parts by mass of the lignin-containing resin obtained in Production Examples 1 to 10 and 12 (for the ratio of lignin to the phenol resin (PR-53195, manufactured Sumitomo Bakelite Co., Ltd.), Table 2 is referred to), 15 parts by mass of hexamethylenetetramine, and 40 parts by mass of an inorganic filler were put into a mortar, and mixed by grinding at room temperature, and then mixed at 100° C. using an open roll mixer. The mixing performance of the mixture was evaluated based on the following criteria. 55 parts by mass of lignin obtained in Comparative Example 1, 30 parts by mass of the phenol resin, 15 parts by mass of hexamethylenetetramine and 40 parts by mass of an inorganic filler were put into a mortar, and mixed by grinding at room temperature, and then mixed at 100° C. using an open roll mixer. The mixing performance of the mixture was evaluated based on the following criteria.

The results are shown in Table 2.

A: Easy to mix. B: Somewhat difficult to mix.
C: Difficult to mix (Much time was taken for uniform mixing).

TABLE 2

|  | Production Example 1 | Production Example 2 | Production Example 3 | Production Example 4 | Production Example 5 | Production Example 6 | Production Example 7 |
| --- | --- | --- | --- | --- | --- | --- | --- |
| Softening Point (° C.) | 120 | 115 | 120 | 125 | 115 | 110 | 120 |
| Moldability | A | A | A | B | A | A | A |

|  | Production Example 8 | Production Example 9 | Production Example 10 | Production Example 12 | Comparative Production Example 1 |
| --- | --- | --- | --- | --- | --- |
| Softening Point (° C.) | 120 | 130 | 130 | 115 | 140 |
| Moldability | A | B | B | A | C |

<Results>

As known from comparison between Production Examples 1 to 10 and 12 and Comparative Example 1, the moldability was improved by previously mixing lignin and phenol resin to prepare a uniform solution.

Examples 1 to 12, and Comparative Examples 1 and 2

[Evaluation of Hexamethylenetetramine-Containing Resin Molded Article]

Using the lignin-containing resins of Production Examples 1 to 12 and the lignin of Comparative Production Example 1, resin molded articles were produced and evaluated in point of the physical properties thereof.

<Method of Blending Resin Composition and Molding Cured Product>

The components were put into a mortar at the blending ratio shown in Table 3 and Table 4, ground and mixed at room temperature, further mixed at 100° C. for 5 minutes using an open roll kneader, and then cooled to room temperature to give a resin composition. The resin composition was ground in a mortar, sandwiched between aluminum plates coated with a release agent, and using a vacuum pressing machine, this was molded under reduced pressure at 100 to 150° C. for 60 minutes. After thus mold, this was cured at 200° C. for 120 minutes to give a molded article.

<Method of Measurement of Bending Strength>

Samples of 5 mm×50 mm×1 mm were cut out of the resultant molded article, and using Instron 5566, the bending strength thereof was measured in a three-point bending mode, to a span of 30 mm and at a speed of 2 mm/min.

TABLE 3

| Production Example of Lignin-Containing Resin | | | Example 1 Production Example 1 | Example 2 Production Example 12 | Example 3 Production Example 2 | Example 4 Production Example 3 | Example 5 Production Example 4 | Example 6 Production Example 5 | Example 7 Production Example 6 |
|---|---|---|---|---|---|---|---|---|---|
| Lignin | | part by mass | 55 | 20 | 55 | 55 | 55 | 55 | 55 |
| Phenol resin | PR-53195 | part by mass | 30 | 65 | 30 | 30 | 30 | 30 | 30 |
| | TD-2040C | part by mass | — | — | — | — | — | — | — |
| Hexamethylene-tetramine | Reagent | part by mass | 15 | 15 | 15 | 15 | 15 | 15 | 15 |
| Inorganic Filler 1 | GF CS3E479S | part by mass | 40 | 40 | 40 | 40 | 40 | 40 | 40 |
| Bending Strength | | MPa | 241 | 232 | 232 | 237 | 236 | 230 | 230 |

TABLE 4

| Production Example of Lignin-Containing Resin | | | Example 8 Production Example 7 | Example 9 Production Example 8 | Example 10 Production Example 9 | Example 11 Production Example 10 | Example 12 Production Example 11 | Comparative Example 1 Comparative Production Example 1 | Comparative Example 2 Comparative Production Example 1 |
|---|---|---|---|---|---|---|---|---|---|
| Lignin | | part by mass | 55 | 55 | 55 | 55 | 55 | 55 | 55 |
| Phenol resin | PR-53195 | part by mass | 30 | 30 | 30 | 30 | — | 30 | — |
| | TD-2040C | part by mass | — | — | — | — | 30 | — | 30 |
| Hexamethylene-tetramine | Reagent | part by mass | 15 | 15 | 15 | 15 | 0 | 15 | — |
| Inorganic Filler 1 | GF CS3E479S | part by mass | 40 | 40 | 40 | 40 | 40 | 40 | 40 |
| Bending Strength | | MPa | 228 | 227 | 231 | 237 | 232 | 225 | 218 |

Phenol resin: PR-53195 (manufactured by Sumitomo Bakelite Co., Ltd.): novolak-type phenol resin
Phenol resin: TD-2040C (manufactured by DIC Corporation): resol-type phenol resin
Inorganic filler 1: Glass fiber GF CS3E479S (manufactured by Nitto Boseki Co., Ltd.)
<Results>

As obvious from comparison between Examples 1 and 12 and Comparative Examples 1 and 2, it is known that the molded article of a cured product of a resin composition prepared by mixing lignin and phenol resin in a lignin-containing solution has a more excellent bending strength than that of a cured product of a resin composition prepared by mixing lignin and phenol resin in a mode of thermal fusion so far as the blending ratio is the same between them.

Examples 13 to 22, and Comparative Example 3

[Evaluation of Epoxy Compound-Containing Resin Composition]

Using the lignin-containing resins of Production Examples 1 to 10 and Comparative Production Example 1, resin molded articles each having the constituent content (part by mass) as shown in Table 5 were produced and evaluated in point of the physical properties thereof.
<Method of Blending Resin Composition and Molding Cured Product>

The components were put into a mortar at the blending ratio shown in Table 5, ground and mixed at room temperature, further mixed at 100° C. for 5 minutes using an open roll kneader, and then cooled to room temperature to give a resin composition. The resin composition was ground in a mortar, sandwiched between aluminum plates coated with a release agent, and using a vacuum pressing machine, this was molded under reduced pressure at 150° C. for 60 minutes. After thus mold, this was cured at 200° C. for 120 minutes to give a molded article.

<Method of Measurement of Bending Strength>

The bending strength was measured according to the above-mentioned method.

<Phenolic Hydroxy Equivalent (Ph-OH amount) and Alcoholic Hydroxy Equivalent (Alc-OH) of Lignin>

Lignin was added to a solvent prepared by mixing heavy chloroform, pyridine and cyclohexanol (internal standard), and further, as a derivatization reagent, 2-chloro-4,4,5,5-tetramethyl-1,3,2-dioxaphospholane was added thereto, and heated at 50° C. for 1 hour. Subsequently, 31P NMR was measured under the measurement condition mentioned below.

Pulse width: 30°

Repeating time: 2 sec

Measurement range: −60 to 200 ppm

Cumulative number: 200 times

The internal standard, hexanol-derived signal is 145.2 ppm, the range of 150.0 to 145.5 ppm belongs to an aliphatic hydroxy group (Alc-OH) and the range of 144.7 to 136.6 ppm to an aromatic hydroxy group (Ph-OH), and the aliphatic hydroxy group amount (mol/g) and the aromatic hydroxy group amount (mol/g) are calculated from the integral value.

<Equivalent Ratio of Phenolic Hydroxy Group (pH-OH) in Lignin, and Epoxy Group (EPO) in Epoxy Group-Having Compound>

Based on the phenolic hydroxy equivalent in lignin calculated in the above and the lignin content, and on the epoxy equivalent of epoxy resin described in the specification of epoxy resin and the epoxy resin content, the equivalent ratio of the phenolic hydroxy group (Ph-OH) in lignin and the epoxy group (EPO) equivalent in the epoxy group-having compound was calculated.

TABLE 5

| Production Example of Lignin-Containing Resin | | Example 13 Production Example 1 | Example 14 Production Example 2 | Example 15 Production Example 3 | Example 16 Production Example 4 | Example 17 Production Example 5 | Example 18 Production Example 6 |
|---|---|---|---|---|---|---|---|
| Lignin | | 29 | 29 | 30 | 29 | 29 | 30 |
| Phenol Resin | PR-53195 | 14 | 14 | 13 | 14 | 14 | 14 |
| Epoxy Resin | N695 | 57 | 57 | 57 | 57 | 57 | 56 |
| Curing Accelerator | 2PZ-CN | 1 | 1 | 1 | 1 | 1 | 1 |
| Inorganic Filler 2 | JAFT 591 | 40 | 40 | 40 | 40 | 40 | 40 |
| Ph—OH amount/EPO amount | | 0.991 | 0.994 | 1.002 | 1.015 | 0.993 | 1.016 |
| Bending Strength | MPa | 265 | 257 | 261 | 260 | 255 | 254 |

| Production Example of Lignin-Containing Resin | | Example 19 Production Example 7 | Example 20 Production Example 8 | Example 21 Production Example 9 | Example 22 Production Example 10 | Comparative Example 3 Comparative Production Example 1 |
|---|---|---|---|---|---|---|
| Lignin | | 29 | 29 | 29 | 29 | 29 |
| Phenol Resin | PR-53195 | 14 | 14 | 14 | 15 | 14 |
| Epoxy Resin | N695 | 57 | 57 | 57 | 56 | 57 |
| Curing Accelerator | 2PZ-CN | 1 | 1 | 1 | 1 | 1 |
| Inorganic Filler 2 | JAFT 591 | 40 | 40 | 40 | 40 | 40 |
| Ph—OH amount/EPO amount | | 1.006 | 1.010 | 0.581 | 0.996 | 0.991 |
| Bending Strength | MPa | 252 | 251 | 255 | 261 | 249 |

Phenol resin: PR-53195 (manufactured by Sumitomo Bakelite Co., Ltd.): novolak-type phenol resin (phenolic hydroxy equivalent: $1.10 \times 10^{-2}$ mol/g)
Epoxy resin 2: Epiclon N695 (manufactured by DIC Corporation) (epoxy equivalent: $4.65 \times 10^{-3}$ mol/g)
Curing accelerator: Curesol 2PZ-CN (manufactured by Shikoku Chemicals Corporation)
Inorganic filler 2: Glass fiber JAFT591 (manufactured by Asahi Fiber Glass Co., Ltd.)
<Results>

As obvious from comparison between Example 13 and Comparative Example 3, it is known that the molded article of a cured product of a resin composition prepared by mixing lignin and phenol resin in a lignin-containing solution has a more excellent bending strength than that of a cured product of a resin composition prepared by mixing lignin and phenol resin in a mode of thermal fusion so far as the blending ratio is the same between the two.

Examples 23 to 281

[Evaluation of Isocyanate Compound-Containing Resin Composition]

Using the lignin-containing resins of Production Examples 1 to 6, resin molded articles each having the constituent content (part by mass) as shown in Table 6 were produced and evaluated in point of the physical properties thereof.
<Method of Blending Resin Composition and Molding Cured Product>

The components were put into a mortar at the blending ratio shown in Table 6, ground and mixed at room temperature, further mixed at 100° C. for 5 minutes using an open roll kneader, and then cooled to room temperature to give a resin composition. The resin composition was ground in a mortar, sandwiched between aluminum plates coated with a release agent, and using a vacuum pressing machine, this was molded under reduced pressure at 100° C. for 60 minutes. After thus mold, this was cured at 150° C. for 60 minutes to give a molded article.
<Method of Measurement of Bending Strength>

The bending strength was measured according to the above-mentioned method.
<Method of Measurement of Glass Transition Temperature>

The glass transition temperature was measured according to a solid viscoelasticity method. Samples of 5 mm×30 mm×1 mm were cut out of the resultant molded article, and using DMA8000 (manufactured by Perkin Elmer Japan Corporation), these were analyzed at 0° C. to 300° C. or at a heating rate of 2° C./min until reach to the lowest elasticity limit, and at 1 Hz. The peak temperature at the resultant tan δ is referred to as the glass transition temperature (Tg).
<Equivalent Ratio of Total of Phenolic Hydroxy Groups and Alcoholic Hydroxy Groups in Lignin to Isocyanate Groups in Isocyanate Compound>

Based on the total of the phenolic hydroxy equivalent and the alcoholic hydroxy equivalent in lignin calculated in the above and the lignin content, and on the isocyanate equivalent of isocyanate compound described in the specification of isocyanate compound and the isocyanate compound content, the equivalent ratio of the total of the phenolic hydroxy groups (Ph-OH) and the alcoholic hydroxy groups (Alc-OH) in lignin and the isocyanate group equivalent (NCO) in the isocyanate compound was calculated.

TABLE 6

| Production Example of Lignin-Containing Resin | | Example 23 Production Example 1 | Example 24 Production Example 2 | Example 25 Production Example 3 | Example 26 Production Example 4 | Example 27 Production Example 5 | Example 28 Production Example 6 |
|---|---|---|---|---|---|---|---|
| Lignin | | 40 | 40 | 40 | 40 | 40 | 40 |
| Phenol Resin | PR-53195 | 15 | 15 | 15 | 15 | 15 | 16 |
| Isocyanate Compound | Reagent | 45 | 45 | 45 | 45 | 45 | 44 |
| Curing Accelerator | Dibutyltin(IV) Dilaurate | 1 | 1 | 1 | 1 | 1 | 1 |

TABLE 6-continued

| Production Example of Lignin-Containing Resin | | Example 23 Production Example 1 | Example 24 Production Example 2 | Example 25 Production Example 3 | Example 26 Production Example 4 | Example 27 Production Example 5 | Example 28 Production Example 6 |
|---|---|---|---|---|---|---|---|
| Aminosilane | SH6020 | 0.5 | 0.5 | 0.5 | 0.5 | 0.5 | 0.5 |
| Inorganic Filler 2 | Silica (FD940) | 30 | 30 | 30 | 30 | 30 | 30 |
| (Ph—OH amount + Alc-OH amount)/NCO amount | | 0.99 | 1.00 | 1.02 | 1.00 | 1.00 | 1.00 |
| Bending Strength | MPa | 140 | 135 | 137 | 136 | 134 | 132 |

Phenol resin: PR-53195 (manufactured by Sumitomo Bakelite Co., Ltd.)
Isocyanate: 4,4'-diphenylmethane diisocyanate reagent (isocyanate equivalent $8.00 \times 10^{-3}$ mol/g)
Curing accelerator: Dibutyltin(IV) dilaurate reagent
Aminosilane: γ-aminopropyltriethoxysilane SH6020 (manufactured by Dow Corning Toray Co., Ltd.)
Inorganic filler 3: Fused silica FD940 (manufactured by Denka Company Limited)
<Results>
It is known that the molded article of the lignin resin composition prepared by mixing lignin and phenol resin in a lignin-containing solution shows a sufficient bending strength.

Reference Examples 1 to 3

[Method of Evaluation of Resultant Cellulose-Containing Solid Substance]
<Enzymatic Saccharification>
One g (dry weight) of the cellulose-containing solid substance obtained in Production Examples 1 to 3 of lignin-containing resin was put into a 50-mL centrifugal tube, and sterilized at 121° C. for 20 minutes. An acetate buffer sterilized in the same manner as above was added to the centrifugal tube so that the resultant liquid amount could reach about 20 mL at pH 5, and then an enzyme (Cellulizer ACE manufactured by Nagase Chemtex Corporation) was added thereto in the amount shown in Table 7. The centrifugal tube was shaken in a constant-temperature bath at 50° C. for 72 hours at 120 rpm.

The activity to produce a reducing power corresponding to 1 μmol of glucose for 1 minute when 1 mL of an enzyme was added to 4 mL of a 0.625% sodium carboxymethyl cellulose (pH 4.5) and reacted thereon at 40° C. for 30 minutes is referred to as 1 CUN. The above enzyme has an enzymatic activity of 1600 CUN/g or more.
<Determination of Glucose Amount in Cellulose-Containing Solid Substance>
[Pretreatment]
As pretreatment, a raw material to be a sample was milled using a Willy mill, and dried at 105° C.
[Constituent Sugar Analysis]
An appropriate amount of the sample of the cellulose-containing solid substance was weighed, 72% sulfuric acid was added thereto, and this was left at 30° C. for 1 hour with stirring as needed. While diluted with pure water, the reaction liquid was completely transferred into a pressure bottle, and treated in an autoclave at 120° C., then this was separated into a filtrate and a residue through filtration. Glucose in the filtrate was quantified through high-performance liquid chromatography.

<Analysis of Sugar Resulting from Enzymatic Saccharification>
Sugar (glucose) was analyzed through high-performance liquid chromatography (HPLC).
(i) Measurement Condition
Column: Shodex SP-G (guard column)+SP0810, manufactured by Showa Denko K.K.
Mobile phase: distilled water (HPLC grade)
Detector: RI (60° C. in cell)
Column temperature: 80° C.
Injection amount: 50 μL
Standard sample for calibration curve: D-(+)-glucose, D-(+)-xylose, manufactured by Tokyo Kasei Kogyo Co., Ltd.
(ii) Sample Preparation
Using a pipetter, 0.2 mL of the sample (solution) was taken in a 10-mL vial bottle.
1.8 mL of distilled water was added and well mixed (10-fold dilution).
This was taken in a vial bottle.
<Calculation Method>
Based on the calibration curve, the glucose concentration (g-glucose/L) was calculated.

Saccharification Rate (%)=[glucose amount (g) in enzymatically-saccharified liquid]/[glucose amount (g) in cellulose-containing solid substance]×100

The results are shown in Table 7.

TABLE 7

| | | | Reference Example 1 | Reference Example 2 | Reference Example 3 |
|---|---|---|---|---|---|
| Production Example of Lignin-Containing Resin | | | Production Example 1 | Production Example 2 | Production Example 3 |
| Enzyme Amount (mL) | 0.05 | Saccharification Rate (%) | 51 | 51 | 45 |
| | 0.1 | Saccharification (%) | 86 | 84 | 80 |
| | 0.5 | Saccharification (%) | 100 | 96 | 98 |

The cellulose-containing solid substance obtained in Production Examples 1 to 3 was almost 100% converted into glucose through enzymatic saccharification.

The invention claimed is:
1. A method of producing a lignin-containing resin composition, comprising:
   a step (A) of obtaining a lignin-containing solution that contains a treatment for separating lignin in a lignin-containing material and a solvent capable of dissolving lignin to obtain a solubilized lignin,
   a step (B) of adding a thermosetting resin to the lignin-containing solution to thereby obtain a lignin/resin-containing solution, and a step (C1) of removing the solvent from the lignin/resin-containing solution wherein the solubilized lignin is not solidified between the step (A) and the step (B).

2. A method of producing a lignin-containing resin composition, comprising:
a step (A) of obtaining a lignin-containing solution that contains a treatment for separating lignin in a lignin-containing material and a solvent capable of dissolving lignin to obtain a solubilized lignin,
a step (B) of adding a resin to the lignin-containing solution to thereby obtain a lignin/resin-containing solution, and
a step (C2) of mixing the lignin/resin-containing solution with at least one solvent selected from water and a hydrocarbon having a dipole moment of 0.25 d or less,
wherein the solvent capable of dissolving lignin is selected from the group consisting of methanol, ethanol, propanol, 1-butanol, 2-methyl-1-propanol, 2-butanol, 2-methyl-2-propanol, pentanol, hexanol, heptanol, octanol, tetrahydrofuran, acetone, methyl ethyl ketone, diethyl ether, ethylene glycol, polyethylene glycol, ethyl acetate, acetonitrile, N,N-dimethylformamide, dimethylsulfoxide, toluene, benzene and water, and
the solubilized lignin is not solidified between the step (A) and the step (B).

3. The method of producing a lignin-containing resin composition according to claim 1, wherein the lignin-containing material is at least one selected from the group consisting of a plant biomass, a saccharification residue obtained in a step of saccharifying a plant biomass, and a side product obtained in a step of saccharifying a plant biomass.

4. The method of producing a lignin-containing resin composition according to claim 1, wherein the treatment for separating lignin in a lignin-containing material is carried out according at least one method selected from the group consisting of an organosolv method, a pressurized hot water method, a steam explosion method, an ammonia treatment method, an ammonia explosion method, an acid treatment method, an alkali treatment method, an oxidative degradation method, a pyrolysis method and a microwave heating method.

5. The method of producing a lignin-containing resin composition according to claim 1, wherein the resin is at least one phenol resin selected from the group consisting of a novolak phenol resin and a resol phenol resin.

6. The method of producing a lignin-containing resin composition according to claim 1, wherein the lignin-containing material is a saccharification residue obtained in a step of saccharifying a plant biomass.

7. The method of producing a lignin-containing resin composition according to claim 1, wherein the solvent capable of dissolving lignin is selected from the group consisting of methanol, ethanol, propanol, 1-butanol, 2-methyl-1-propanol, 2-butanol, 2-methyl-2-propanol, pentanol, hexanol, heptanol, octanol, tetrahydrofuran, acetone, methyl ethyl ketone, diethyl ether, ethylene glycol, polyethylene glycol, ethyl acetate, acetonitrile, N,N-dimethylformamide, dimethylsulfoxide, toluene, benzene and water, and
the solubilized lignin is not solidified between the step (A) and the step (B).

* * * * *